US012549268B2

(12) United States Patent
Wei et al.

(10) Patent No.: US 12,549,268 B2
(45) Date of Patent: Feb. 10, 2026

(54) RANDOM ACCESS METHOD, APPARATUS AND SYSTEM, STORAGE MEDIUM, AND ELECTRONIC APPARATUS

(71) Applicant: ZTE Corporation, Shenzhen (CN)

(72) Inventors: Hao Wei, Shenzhen (CN); Huanhuan Mao, Shenzhen (CN); Haining Mou, Shenzhen (CN); Jie Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 387 days.

(21) Appl. No.: 18/020,314

(22) PCT Filed: Jun. 30, 2021

(86) PCT No.: PCT/CN2021/103850
§ 371 (c)(1),
(2) Date: Feb. 8, 2023

(87) PCT Pub. No.: WO2022/042024
PCT Pub. Date: Mar. 3, 2022

(65) Prior Publication Data
US 2023/0309148 A1    Sep. 28, 2023

(30) Foreign Application Priority Data

Aug. 28, 2020    (CN) .......................... 202010889907.3

(51) Int. Cl.
*H04W 4/00*    (2018.01)
*H04B 17/318*    (2015.01)
(Continued)

(52) U.S. Cl.
CPC ........ *H04B 17/328* (2023.05); *H04W 74/002* (2013.01); *H04W 74/0836* (2024.01); *H04W 74/0833* (2013.01)

(58) Field of Classification Search
CPC ........... H04W 74/0833; H04W 74/002; H04W 74/0866; H04W 48/20; H04W 74/0836;
(Continued)

(56) References Cited

U.S. PATENT DOCUMENTS

2020/0053799 A1     2/2020  Jeon
2021/0345410 A1 *  11/2021  Zhou ................. H04W 74/0833
2023/0060894 A1 *   3/2023  Rastegardoost ..... H04B 7/0695

FOREIGN PATENT DOCUMENTS

CN     109842953 A    6/2017
CN     109600211 A    4/2019
(Continued)

OTHER PUBLICATIONS

International Search report for corresponding application PCT/CN2021/103850 filed Jun. 30, 2021; Mail date Sep. 9, 2021.
(Continued)

*Primary Examiner* — Thai Dinh Hoang
(74) *Attorney, Agent, or Firm* — CANTOR COLBURN LLP (57) ABSTRACT

Provided is a random access method, including: a broadcast signal sent by a base station on a non-SUL carrier is received, the broadcast signal is parsed to obtain a first RSRP threshold and a second RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; an RSRP of the broadcast signal on the non-SUL carrier is measured to obtain a measured RSRP; and carriers for sending the MsgA PUSCH signal and the MsgA PRACH signal are determined separately according to a numerical relation between the
(Continued)

measured RSRP and the first RSRP threshold and the second RSRP threshold.

11 Claims, 3 Drawing Sheets

(51) Int. Cl.
*H04W 74/00* (2009.01)
*H04W 74/0836* (2024.01)
*H04W 74/0833* (2024.01)

(58) Field of Classification Search
CPC ..... H04B 17/328; H04L 5/001; H04L 5/0053; H04L 5/006
See application file for complete search history.

(56) References Cited

FOREIGN PATENT DOCUMENTS

| | | | |
|---|---|---|---|
| CN | 109803398 A | 5/2019 | |
| CN | 111278142 A | 6/2020 | |
| CN | 114124323 A * | 3/2022 | ........... H04B 17/328 |
| WO | 2018171194 A1 | 9/2018 | |
| WO | 2019141101 A1 | 7/2019 | |
| WO | 2019216697 A1 | 11/2019 | |
| WO | 2020060371 A1 | 3/2020 | |
| WO | 2020151743 A1 | 7/2020 | |

OTHER PUBLICATIONS

GPP TS 38.321 V16.1.0, "Medium Access Control (MAC) protocol specification", Jul. 2020.
European Search Report for corresponding application EP 21859864; Jan. 30, 2024.

* cited by examiner

A broadcast signal is sent to a terminal on a non-SUL carrier, where the broadcast signal is configured for instructing the terminal to parse the broadcast signal to obtain a first RSRP threshold and a second RSRP threshold, where the broadcast signal carries the first RSRP threshold and the second RSRP threshold, the second RSRP threshold being greater than the first RSRP threshold, the first RSRP threshold being an RSRP limit value at which an MsgA PUSCH signal is received and parsed on the non-SUL carrier to reach a target block error rate, and the second RSRP threshold being an RSRP limit value at which an MsgA PRACH signal is received and parsed on the non-SUL carrier to reach a target block error rate; the broadcast signal is further configured for instructing the terminal to measure an RSRP of the broadcast signal on the non-SUL carrier, so as to obtain a measured RSRP; and the broadcast signal is further configured for instructing the terminal to determine carriers for sending the MsgA PUSCH signal and the MsgA PRACH signal separately according to a numerical relation among the measured RSRP, the first RSRP threshold, and the second RSRP threshold ⎯ S301

RANDOM ACCESS METHOD, APPARATUS AND SYSTEM, STORAGE MEDIUM, AND ELECTRONIC APPARATUS

CROSS-REFERENCE TO RELATED APPLICATION

The disclosure claims the priority to Chinese Patent Application No. 202010889907.3, filed to the Chinese Patent Office on Aug. 28, 2020 and entitled "RANDOM ACCESS METHOD, APPARATUS AND SYSTEM, STORAGE MEDIUM, AND ELECTRONIC APPARATUS", which is incorporated in its entirety herein by reference.

TECHNICAL FIELD

The disclosure relates to the technical field of communication, and in particular to a random access method, apparatus and system, a storage medium, and an electronic apparatus.

BACKGROUND

In a two-step random access process, a preamble of a two-step random access message A physical random access channel (MsgA PRACH) is generally orthogonal or quasi-orthogonal. In order to protect a two-step random access message A physical uplink shared channel (MsgA PUSCH) against massive payload resource reservation, generally, a plurality of preambles are configured to correspond to one PUSCH resource unit (PRU). Therefore, the payload has a higher collision probability than the preamble. The preamble detection is merely to detect whether a sequence exists, while data are required to be demodulated and decoded when the payload is parsed. Therefore, payload parsing requires a higher channel quality than the preamble detection. Therefore, it is a technical problem to be solved urgently of how to guarantee sending of an MsgA PRACH signal and an MsgA PUSCH signal, so as to increase an access success rate of the signals.

SUMMARY

Examples of the disclosure provide a random access method, apparatus and system, a storage medium, and an electronic apparatus, to at least solve the problem of how to guarantee sending of an MsgA PRACH signal and an MsgA PUSCH signal, so as to reduce an error probability when parsing the signals in the related art.

An example of the disclosure provides a random access method. The method is applied to a terminal and includes: a broadcast signal sent by a base station on a non-supplementary uplink (SUL) carrier is received, and the broadcast signal is parsed to obtain a first reference signal receiving power (RSRP) threshold and a second RSRP threshold, where the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; an RSRP of the broadcast signal on the non-SUL carrier is measured to obtain a measured RSRP; and carriers for sending the MsgA PUSCH signal and the MsgA PRACH signal are determined separately according to a numerical relation between the measured RSRP and the first RSRP threshold and the second RSRP threshold.

Another example of the disclosure provides a random access method. The method is applied to a base station and includes: a broadcast signal is sent to a terminal on a non-SUL carrier, where the broadcast signal is configured for instructing the terminal to parse the broadcast signal to obtain a first RSRP threshold and a second RSRP threshold, and the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; the broadcast signal is further configured for instructing the terminal to measure an RSRP of the broadcast signal on the non-SUL carrier, so as to obtain a measured RSRP; and the broadcast signal is further configured for instructing the terminal to determine carriers for sending the MsgA PUSCH signal and the MsgA PRACH signal separately according to a numerical relation between the measured RSRP and the first RSRP threshold and the second RSRP threshold.

Yet another example of the disclosure provides a random access apparatus. The apparatus includes: a reception module configured to receive a broadcast signal sent by a base station on a non-SUL carrier, and parse the broadcast signal to obtain a first RSRP threshold and a second RSRP threshold, where the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; a measurement module configured to measure an RSRP of the broadcast signal on the non-SUL carrier to obtain a measured RSRP; and a determination module configured to determine carriers for sending the MsgA PUSCH signal and the MsgA PRACH signal separately according to a numerical relation between the measured RSRP and the first RSRP threshold and the second RSRP threshold.

Yet another example of the disclosure provides a random access apparatus. The apparatus includes: a sending module configured to send a broadcast signal to a terminal on a non-SUL carrier, where the broadcast signal is configured for instructing the terminal to parse the broadcast signal to obtain a first RSRP threshold and a second RSRP threshold, and the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; the broadcast signal is further configured for instructing the terminal to measure an RSRP of the broadcast signal on the non-SUL carrier, so as to obtain a measured RSRP; and the broadcast signal is further configured for instructing the terminal to determine carriers for sending the MsgA PUSCH signal and the MsgA PRACH signal separately according to a numerical relation between the measured RSRP and the first RSRP threshold and the second RSRP threshold.

Yet another example of the disclosure provides a random access system. The system includes a base station and a terminal; where the base station is configured to send a broadcast signal to a terminal on a non-SUL carrier; the terminal is configured to receive the broadcast signal sent by the base station on the non-SUL carrier, and parse the broadcast signal to obtain a first RSRP threshold and a second RSRP threshold, where the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; the terminal is further configured to measure an RSRP of the broadcast signal on the non-SUL carrier to obtain a measured RSRP; and the terminal is further configured to determine carriers for sending the MsgA PUSCH signal and the MsgA PRACH signal separately according to a numerical relation between the measured RSRP and the first RSRP threshold and the second RSRP threshold.

Yet another example of the disclosure provides a computer-readable storage medium, storing a computer program, where the computer program is configured for executing steps of any one of the method examples described above when run.

Yet another example of the disclosure provides an electronic apparatus, including a memory and a processor, where the memory stores a computer program, and the processor is configured for running the computer program to execute steps of any one of the method examples described above.

According to the examples of the disclosure, the broadcast signal sent by the base station on the non-SUL carrier is received and parsed to obtain the first RSRP threshold and the second RSRP threshold, where the broadcast signal carries the first RSRP threshold and the second RSRP threshold, the second RSRP threshold being greater than the first RSRP threshold, the first RSRP threshold being the RSRP limit value at which the MsgA PRACH signal is received and parsed on the non-SUL carrier to reach the target block error rate, and the second RSRP threshold being the RSRP limit value at which the MsgA PUSCH signal is received and parsed on the non-SUL carrier to reach the target block error rate; and the RSRP of the broadcast signal is measured on the non-SUL carrier to obtain the measured RSRP; and the carriers for sending the MsgA PUSCH signal and the MsgA PRACH signal are determined separately according to the numerical relation between the measured RSRP and the first RSRP threshold and the second RSRP threshold.

DETAILED DESCRIPTION OF THE EMBODIMENTS

The examples of the disclosure will be described in detail below in conjunction with the accompanying drawings and the examples.

It should be noted that the terms "first", "second", etc. in the description and claims of the disclosure are used for distinguishing between similar objects, instead of necessarily describing a specific sequence or a precedence order.

Figure 1:
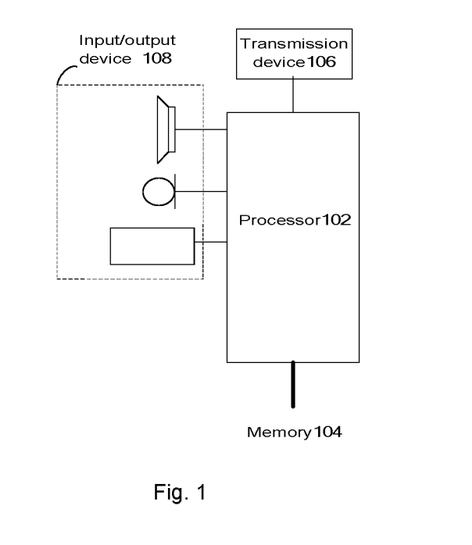
FIG. 1 is a structural block diagram of hardware of a mobile terminal of a random access method according to an example of the disclosure.

A method example according to the example of the disclosure may be executed in a mobile terminal, a computer terminal, or a similar computing apparatus. For example, when the method example is run on the mobile terminal, FIG. 1 is a structural block diagram of hardware of a mobile terminal of a random access method according to an example of the disclosure. As shown in FIG. 1, the mobile terminal may include one or more processors 102 and a memory 104 configured for storing data, where only one processor is shown in FIG. 1, the processors 102 may include, but are not limited to, processing apparatuses such as a microcontroller unit (MCU) or a field programmable gate array (FPGA), and the mobile terminal described above may further include a transmission device 106 configured as a communication function and an input/output device 108. Those of ordinary skill in the art can understand that the structure shown in FIG. 1 is only schematic, and does not limit the structure of the mobile terminal described above. For example, the mobile terminal may also include more or fewer assemblies than that shown in FIG. 1, or have a configuration differing from that shown in FIG. 1.

The memory 104 may be configured for storing a computer program, for example, a software program and a module of application software, such as a computer programs corresponding to the random access method in the example of the disclosure. The processor 102 runs the computer program stored in the memory 104 to execute various functional applications and data processing, that is, to realize the method described above. The memory 104 may include a high-speed random access memory, and may also include a non-volatile memory, such as one or more magnetic storage apparatuses, flashes, or other non-volatile solid-state memories. In some instances, the memory 104 may further include memories remotely configured relative to the processor 102, where these remote memories may be connected with the mobile terminal through networks. The instances of the networks described above include, but are not limited to, the Internet, an intranet, a local area network, a mobile communication network, and combinations thereof.

The transmission device 106 is configured for receiving or sending data via one network. The specific instances of the networks described above may include a wireless network provided by a communication provider of the mobile terminal. In one instance, the transmission device 106 includes a network interface controller (NIC) that may be connected with other network devices through a base station to communicate with the Internet. In one instance, the transmission device 106 may be a radio frequency (RF) module. The transmission device 106 is configured for communicating with the Internet wirelessly.

The example of the disclosure may run on a network architecture in which a base station and a terminal interact with each other.

Figure 2:
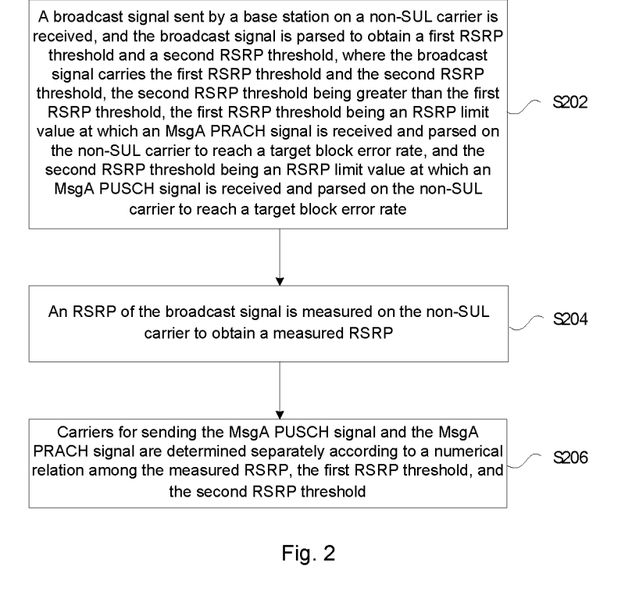
FIG. 2 is a flowchart of a random access method according to an example of the disclosure.

The example provides a random access method running on the mobile terminal or network architecture described above. FIG. 2 is a flowchart of a random access method according to an example of the disclosure. As shown in FIG. 2, the flow includes:

Step S202, a broadcast signal sent by a base station on a non-SUL carrier is received, and the broadcast signal is parsed to obtain a first RSRP threshold and a second RSRP threshold, where the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate.

Step S204, an RSRP of the broadcast signal is measured on the non-SUL carrier to obtain a measured RSRP.

Step S206, carriers for sending the MsgA PUSCH signal and the MsgA PRACH signal are determined separately according to a numerical relation between the measured RSRP and the first RSRP threshold and the second RSRP threshold.

Through the steps described above, the broadcast signal sent by the base station on the non-SUL carrier is received and parsed to obtain the first RSRP threshold and the second RSRP threshold, where the broadcast signal carries the first RSRP threshold and the second RSRP threshold, the second RSRP threshold being greater than the first RSRP threshold, the first RSRP threshold being the RSRP limit value at which the MsgA PRACH signal is received and parsed on the non-SUL carrier to reach the target block error rate, and the second RSRP threshold being the RSRP limit value at which the MsgA PUSCH signal is received and parsed on the non-SUL carrier to reach the target block error rate; the RSRP of the broadcast signal is measured on the non-SUL carrier to obtain the measured RSRP; and the carriers for sending the MsgA PUSCH signal and the MsgA PRACH signal are determined separately according to the numerical relation between the measured RSRP and the first RSRP threshold and the second RSRP threshold. Therefore, sending of the MsgA PRACH signal and the MsgA PUSCH signal may be guaranteed to reduce an error probability of parsing the signals, thereby increasing an access success rate.

It should be noted that the RSRP limit value in the example may be a preset simulated value. If the measured RSRP on the non-SUL carrier is less than the RSRP limit value, the block error rate corresponding to the non-SUL carrier may not reach the target block error rate, so that system performance requirements may not be satisfied. The block error rate may reach a standard by switching to the SUL carrier, thereby increasing the access success rate.

It should be noted that the "broadcast signal" in the example may be a synchronization signal and physical broadcast channel (PBCH) block (SSB) signal.

In an illustrative embodiment, the step that carriers for sending the MsgA PUSCH signal and the MsgA PRACH signal are determined separately according to the numerical relation between the measured RSRP and the first RSRP threshold and the second RSRP threshold includes one of the following:

the MsgA PUSCH signal and the MsgA PRACH signal are sent on an SUL carrier in the condition that the measured RSRP is less than the first RSRP threshold; or the MsgA PUSCH signal is sent on an SUL carrier, and the MsgA PRACH signal is sent on the non-SUL carrier in the condition that the measured RSRP is greater than the first RSRP threshold and less than the second RSRP threshold; or the MsgA PUSCH signal and the MsgA PRACH signal are sent on the non-SUL carrier in the condition that the measured RSRP is greater than the second RSRP threshold.

When the measured RSRP on the non-SUL carrier is less than the limit value, the signal is switched from the non-SUL carrier to the SUL carrier, so that the signal may also satisfy a signal parsing standard (for example, the block error rate reaches the standard) even when the RSRP is low.

In an illustrative embodiment, access resources of both the SUL carrier and the non-SUL carrier are configured by the base station before the step that carriers for sending the MsgA PUSCH signal and the MsgA PRACH signal are determined separately according to the numerical relation between the measured RSRP and the first RSRP threshold and the second RSRP threshold. It should be noted that the access resources of both the SUL carrier and the non-SUL carrier are pre-configured by the base station, so as to guarantee that a channel is switched between different carriers. Therefore, no matter on which carrier the channel sends the signal, an access process is not affected.

Figure 3:
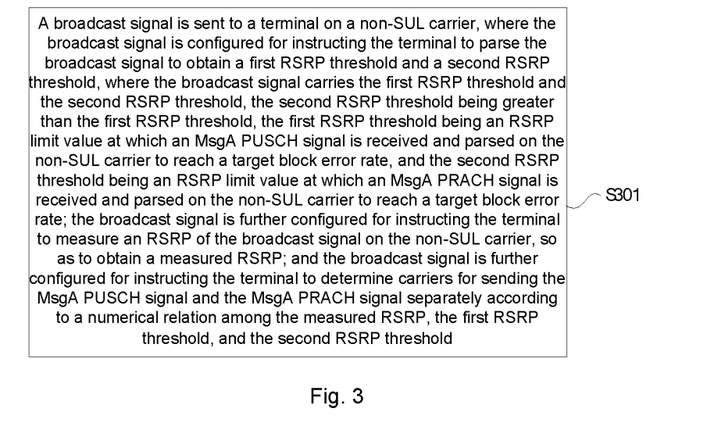
FIG. 3 is a flowchart of another random access method according to an example of the disclosure.

The example further provides a random access method applied to a base station. FIG. 3 is a flowchart of another random access method according to an example of the disclosure. As shown in FIG. 3, the flow includes:

Step S301, a broadcast signal is sent to a terminal on a non-SUL carrier, where the broadcast signal is configured for instructing the terminal to parse the broadcast signal to obtain a first RSRP threshold and a second RSRP threshold, where the broadcast signal carries the first RSRP threshold and the second RSRP threshold, the second RSRP threshold being greater than the first RSRP threshold, the first RSRP threshold being an RSRP limit value at which an MsgA PUSCH signal is received and parsed on the non-SUL carrier to reach a target block error rate, and the second RSRP threshold being an RSRP limit value at which an MsgA PRACH signal is received and parsed on the non-SUL carrier to reach a target block error rate; the broadcast signal is further configured for instructing the terminal to measure an RSRP of the broadcast signal on the non-SUL carrier, so as to obtain a measured RSRP; and the broadcast signal is further configured for instructing the terminal to determine carriers for sending the MsgA PUSCH signal and the MsgA PRACH signal separately according to a numerical relation between the measured RSRP and the first RSRP threshold and the second RSRP threshold.

Through the step described above, sending of the MsgA PRACH signal and the MsgA PUSCH signal may be guaranteed to reduce an error probability of parsing the signals, thereby increasing an access success rate.

In an illustrative embodiment, the MsgA PUSCH signal and the MsgA PRACH signal are sent on an SUL carrier in the condition that the measured RSRP is less than the first RSRP threshold; or the MsgA PUSCH signal is sent on an SUL carrier, and the MsgA PRACH signal is sent on the non-SUL carrier in the condition that the measured RSRP is greater than the first RSRP threshold and less than the second RSRP threshold; or the MsgA PUSCH signal and the MsgA PRACH signal are sent on the non-SUL carrier in the condition that the measured RSRP is greater than the second RSRP threshold.

In an illustrative embodiment, the method further includes: access resources of both the SUL carrier and the non-SUL carrier are configured before the step that carriers for sending the MsgA PUSCH signal and the MsgA PRACH signal are determined separately according to the numerical relation between the measured RSRP and the first RSRP threshold and the second RSRP threshold.

The example further provides a random access apparatus. The apparatus is configured for implementing the example described above and optional embodiments, the similarities of which will not be described in detail herein. As used below, the term "module" may be a combination of software and/or hardware that implements a preset function. While the apparatus described in the following example is preferably implemented through software, it is possible to conceive that the apparatus is implemented through hardware, or a combination of the software and the hardware.

Figure 4:
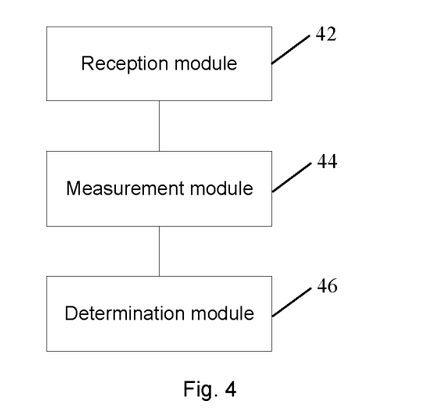
FIG. 4 is a structural block diagram of a random access apparatus according to an example of the disclosure.

FIG. 4 is a structural block diagram of a random access apparatus according to an example of the disclosure. As shown in FIG. 4, the apparatus includes:

a reception module 42 configured to receive a broadcast signal sent by a base station on a non-SUL carrier, and parse the broadcast signal to obtain a first RSRP threshold and a second RSRP threshold, where the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate;

a measurement module 44 configured to measure an RSRP of the broadcast signal on the non-SUL carrier to obtain a measured RSRP; and a determination module 46 configured to determine carriers for sending the MsgA PUSCH signal and the MsgA PRACH signal separately according to a numerical relation between the measured RSRP and the first RSRP threshold and the second RSRP threshold.

Through the modules described above, sending of the MsgA PRACH signal and the MsgA PUSCH signal may be guaranteed to reduce an error probability of parsing the signals, thereby increasing an access success rate.

In an illustrative embodiment, the determination module is further configured to:

send the MsgA PUSCH signal and the MsgA PRACH signal on an SUL carrier in the condition that the measured RSRP is less than the first RSRP threshold; or send the MsgA PUSCH signal on an SUL carrier, and send the MsgA PRACH signal on the non-SUL carrier in the condition that the measured RSRP is greater than the first RSRP threshold and less than the second RSRP threshold; or send the MsgA PUSCH signal and the MsgA PRACH signal on the non-SUL carrier in the condition that the measured RSRP is greater than the second RSRP threshold.

In an illustrative embodiment, access resources of both the SUL carrier and the non-SUL carrier are configured by the base station before the step that carriers for sending the MsgA PUSCH signal and the MsgA PRACH signal are determined separately according to a numerical relation between the measured RSRP and the first RSRP threshold and the second RSRP threshold.

It should be noted that each module described above may be implemented through software or hardware. The latter may be implemented through, but not limited to, the following methods: the modules described above are all positioned in the same processor; or all the modules described above are positioned in different processors in any combination.

The example further provides another random access apparatus. The apparatus is configured for implementing the example described above and optional embodiments, the similarities of which will not be described in detail herein. As used below, the term "module" may be a combination of software and/or hardware that implements a preset function. While the apparatus described in the following example is preferably implemented through software, it is possible to conceive that the apparatus is implemented through hardware, or a combination of the software and the hardware.

Figure 5:
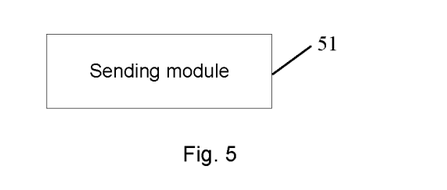
FIG. 5 is a structural block diagram of another random access apparatus according to an example of the disclosure.

FIG. 5 is a structural block diagram of another random access apparatus according to an example of the disclosure. As shown in FIG. 5, the apparatus includes:

a sending module 51 configured to send a broadcast signal to a terminal on a non-SUL carrier, where the broadcast signal is configured for instructing the terminal to parse the broadcast signal to obtain a first RSRP threshold and a second RSRP threshold, the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; the broadcast signal is further configured for instructing the terminal to measure an RSRP of the broadcast signal on the non-SUL carrier, so as to obtain a measured RSRP; and the broadcast signal is further configured for instructing the terminal to determine carriers for sending the MsgA PUSCH signal and the MsgA PRACH signal separately according to a numerical relation between a measured RSRP and the first RSRP threshold and the second RSRP threshold.

Through the module described above, sending of the MsgA PRACH signal and the MsgA PUSCH signal may be guaranteed to reduce an error probability of parsing the signals, thereby increasing an access success rate.

In an illustrative embodiment, the MsgA PUSCH signal and the MsgA PRACH signal are sent on an SUL carrier in the condition that the measured RSRP is less than the first RSRP threshold; or the MsgA PUSCH signal is sent on an SUL carrier, and the MsgA PRACH signal is sent on the non-SUL carrier in the condition that the measured RSRP is greater than the first RSRP threshold and less than the second RSRP threshold; or the MsgA PUSCH signal and the MsgA PRACH signal are sent on the non-SUL carrier in the condition that the measured RSRP is greater than the second RSRP threshold.

In an illustrative embodiment, the apparatus further includes: a configuration module configured to configure access resources of both the SUL carrier and the non-SUL carrier before the step that carriers for sending the MsgA PUSCH signal and the MsgA PRACH signal are determined separately according to the numerical relation between the measured RSRP and the first RSRP threshold and the second RSRP threshold.

It should be noted that each module described above may be implemented through software or hardware. The latter may be implemented through, but not limited to, the following methods: the modules described above are all positioned in the same processor; and alternatively, all the modules described above are positioned in different processors in any combination.

Figure 6:
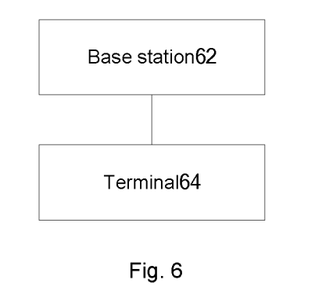
FIG. 6 is a structural block diagram of a random access system according to an example of the disclosure.

The example further provides a random access system. FIG. 6 is a structural block diagram of the random access system according to an example of the disclosure. As shown in FIG. 6, the system includes:

a base station 62 and a terminal 64; where the base station 62 is configured to send a broadcast signal to the terminal on a non-SUL carrier; the terminal 64 is configured to receive the broadcast signal sent by the base station on the non-SUL carrier, and parse the broadcast signal to obtain a first RSRP threshold and a second RSRP threshold, where the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; the terminal 64 is further configured to measure an RSRP of the broadcast signal on the non-SUL carrier to obtain a measured RSRP; and the terminal 64 is further configured to determine carriers for sending the MsgA PUSCH signal and the MsgA PRACH signal separately according to a numerical relation between the measured RSRP and the first RSRP threshold and the second RSRP threshold.

Through the system described above, sending of the MsgA PRACH signal and the MsgA PUSCH signal may be guaranteed to reduce an error probability of parsing the signals, thereby increasing an access success rate.

In an illustrative embodiment, the terminal 64 is further configured to:

send the MsgA PUSCH signal and the MsgA PRACH signal on an SUL carrier in the condition that the measured RSRP is less than the first RSRP threshold; or send the MsgA PUSCH signal on an SUL carrier, and send the MsgA PRACH signal on the non-SUL carrier in the condition that the measured RSRP is greater than the first RSRP threshold and less than the second RSRP threshold; or send the MsgA PUSCH signal and the MsgA PRACH signal on the non-SUL carrier in the condition that the measured RSRP is greater than the second RSRP threshold.

In an illustrative embodiment, the base station 62 is further configured to configure access resources of both the SUL carrier and the non-SUL carrier before the step that carriers for sending the MsgA PUSCH signal and the MsgA PRACH signal are determined separately according to the numerical relation between the measured RSRP and the first RSRP threshold and the second RSRP threshold.

ILLUSTRATIVE EMBODIMENT

The examples of the disclosure are further described below in combination with application scenarios.

In an exemplary embodiment, an example of the disclosure provides a method for selecting an uplink carrier. The method may be applied to a two-step random access process. Through this method, in a two-step random access scenario, a user may separately select uplink carriers for sending an MsgA PRACH signal and an MsgA PUSCH signal according to an actual beam quality measurement situation and a set threshold. It should be noted that the method for selecting an uplink carrier in the example may also be applied to a four-step random access scenario.

In an illustrative embodiment, a cell (or a cell base station) is configured with a non-SUL carrier and a SUL carrier, where the SUL carrier has a lower frequency than the non-SUL carrier, so that a user may obtain better measuring and parsing performance when sending an uplink signal to the base station on the SUL carrier. The base station configures resources corresponding to two-step random access for both the non-SUL carrier and the SUL carrier. The base station sends a synchronization signal and PBCH block (SSB) signal on a downlink carrier corresponding to the non-SUL carrier, accompanied by two reference signal receiving power (RSRP) thresholds. The user selects the uplink carriers for sending the MsgA PRACH signal and the MsgA PUSCH signal according to a measured RSRP of the SSB on the downlink carrier corresponding to the non-SUL carrier and the two obtained RSRP thresholds.

In an illustrative embodiment, the two RSRP thresholds are determined by the base station according to a system simulation situation. Initial values are determined first, and may be adjusted subsequently in combination with an actual communication situation. The base station has the setting right.

In an illustrative embodiment, the two RSRP thresholds represent that when the user sends the PRACH signal or the PUSCH signal on the SUL carrier and the non-SUL carrier under a channel condition reaching the threshold, the block error rate (BLER), that is, system performance, generated when the base station receives the two signals for measuring and parsing just reaches a specified standard. That is, the first threshold represents the RSRP limit value at which the MsgA PUSCH signal is received and parsed on the non-SUL carrier to satisfy a block error rate compliance condition (for example, to reach a specified value), and the second threshold represents the RSRP limit value at which the MsgA PRACH signal is received and parsed on the non-SUL carrier to satisfy a block error rate compliance condition (for example, to reach a specified value).

The method is the method for selecting an uplink carrier in the two-step random access. The user selects the uplink carriers for sending the MsgA PRACH signal and the MsgA PUSCH signal according to the measured RSRP of the SSB on the downlink carrier corresponding to the non-SUL carrier and the two obtained RSRP thresholds. The method for selecting an uplink carrier in the two-step random access related to the disclosure is implemented on, but not limited to, devices and chips such as a digital signal processor (DSP), a field programmable gate array (FPGA), and an application specific integrated circuit (ASIC).

According to an electromagnetic wave transmission theory, an electromagnetic wave having a higher frequency has a greater transmission loss. The SUL and the non-SUL have different frequency bands, where the SUL is in a lower frequency band, and the non-SUL is in a higher frequency band. Therefore, when the specified BLER standard is reached, the non-SUL frequency band requires a higher power to transmit a signal than the SUL frequency band. According to the dual property of the channel, an RSRP of a downlink measurement may characterize a transmission loss characteristic of a channel. Therefore, an RSRP threshold is employed to select between SUL signal transmission and non-SUL signal transmission.

Figure 7:
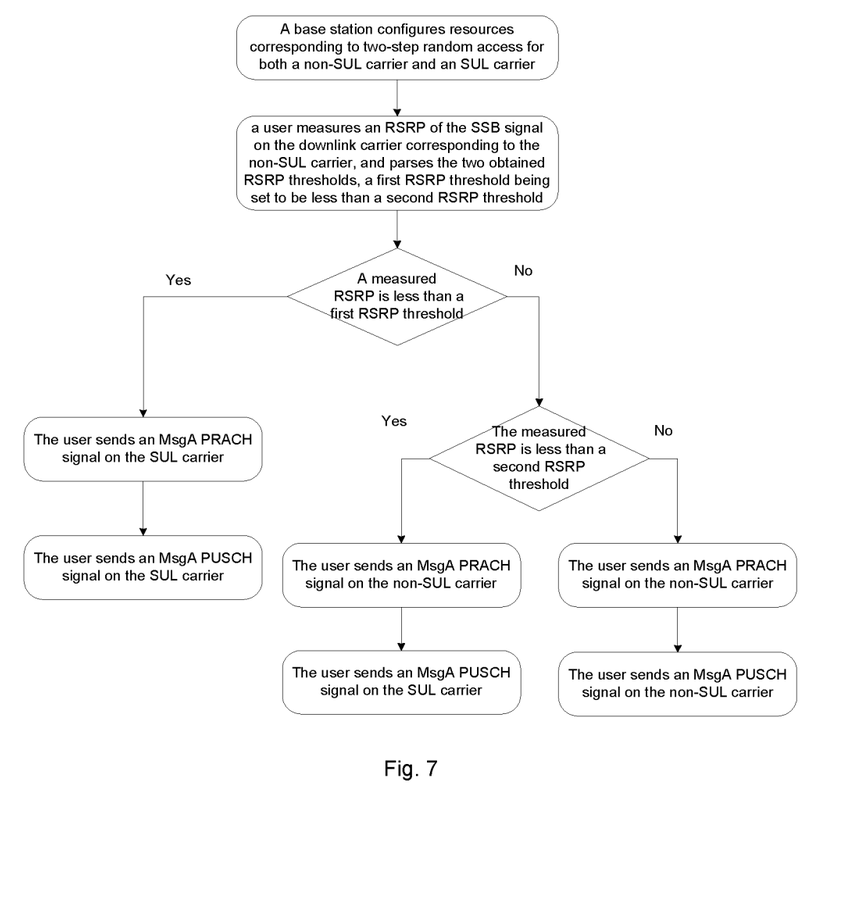
FIG. 7 is a flowchart of a random access method according to an illustrative embodiment of the disclosure.

In an illustrative embodiment, FIG. 7 is a flowchart of a random access method according to an illustrative embodiment of the disclosure. As shown in FIG. 7, a channel sending method according to the example includes:

Step 1, a base station configures resources corresponding to two-step random access for both a non-SUL carrier and an SUL carrier. The base station sends an SSB signal on a downlink carrier corresponding to the non-SUL carrier, accompanied by two RSRP thresholds.

Step 2, a user measures an RSRP of the SSB signal on the downlink carrier corresponding to the non-SUL carrier, and parses the two obtained RSRP thresholds, a first RSRP threshold being set to be less than a second RSRP threshold.

Step 3, the measured RSRP is compared with the two RSRP thresholds. The user sends an MsgA PRACH signal and an MsgA PUSCH signal on the SUL carrier if the measured RSRP is less than the first RSRP threshold.

Step 4, the user sends the MsgA PRACH signal on the non-SUL carrier, and sends the MsgA PUSCH signal on the SUL carrier if the measured RSRP is greater than the first RSRP threshold and less than the second RSRP threshold.

Step 5, the user sends the MsgA PRACH signal and the MsgA PUSCH signal on the non-SUL carrier if the measured RSRP is greater than the second RSRP threshold.

Through the method according to the example, the user may obtain higher reception performance when sending an MsgA on the SUL carrier, thereby increasing an access success probability of system. Moreover, the uplink carriers of the MsgA PRACH signal and the MsgA PUSCH signal are selected separately, so that the condition that the MsgA PUSCH signal requires a higher channel quality than the MsgA PRACH signal when received and parsed may be satisfied, while spectrum resources may be fully and flexibly utilized.

Several scenarios are listed below as examples to further describe the solutions of the example of the disclosure:

In an illustrative embodiment, the channel sending method according to the example includes:

Step 1, a base station configures resources corresponding to two-step random access for both a non-SUL carrier and an SUL carrier. The base station sends an SSB signal on a downlink carrier corresponding to the non-SUL carrier, accompanied by two RSRP thresholds $\xi_1$ and $\xi_2$, where $0<\xi_1<\xi_2$.

Step 2, a user measures the SSB signal on the downlink carrier corresponding to the non-SUL carrier to obtain an RSRP $\xi$, and parses the two obtained RSRP thresholds $\xi_1$ and $\xi_2$.

Step 3, the user obtains $\xi<\xi_1$ through comparison, and sends an MsgA PRACH signal and an MsgA PUSCH signal on the SUL carrier.

In an illustrative embodiment, the channel sending method according to the example includes:

Step 1, a base station configures resources corresponding to two-step random access for both a non-SUL carrier and an SUL carrier. The base station sends an SSB signal on a downlink carrier corresponding to the non-SUL carrier, accompanied by two RSRP thresholds $\xi_1$ and $\xi_2$, where $0<\xi_1<\xi_2$.

Step 2, a user measures the SSB signal on the downlink carrier corresponding to the non-SUL carrier to obtain an RSRP $\xi$, and parses the two obtained RSRP thresholds $\xi_1$ and $\xi_2$.

The user obtains $\xi_1 \leq \xi < \xi_2$ through comparison, sends an MsgA PRACH signal on the non-SUL carrier, and sends an MsgA PUSCH signal on the SUL carrier.

In an illustrative embodiment, the channel sending method according to the example includes:

Step 1, a base station configures resources corresponding to two-step random access for both a non-SUL carrier and an SUL carrier. The base station sends an SSB signal on a downlink carrier corresponding to the non-SUL carrier, accompanied by two RSRP thresholds $\xi_1$ and $\xi_2$, where $0<\xi_1<\xi_2$.

Step 2, a user measures the SSB signal on the downlink carrier corresponding to the non-SUL carrier to obtain an RSRP $\xi$, and parses the two obtained RSRP thresholds $\xi_1$ and $\xi_2$.

Step 3, the user obtains $\xi_2 \leq \xi$ through comparison, and sends an MsgA PRACH signal and an MsgA PUSCH signal on the non-SUL carrier.

An example of the disclosure further provides a computer-readable storage medium, storing a computer program, where the computer program is configured for executing steps of any one of the method examples described above when run.

In an illustrative embodiment, the computer-readable storage medium described above may include, but is not limit to, various media storing a computer program, such as a universal serial bus (USB) flash disk, a read-only memory (ROM), a random access memory (RAM), a mobile hard disk, a magnetic disk or an optical disk, etc.

An example of the disclosure further provides an electronic apparatus, including a memory and a processor, where the memory stores a computer program, and the processor is configured for running the computer program to execute steps of any one of the method examples described above.

In an illustrative embodiment, the electronic apparatus described above may further include a transmission device and an input/output device, where both the transmission device and the input/output device are connected with the processor described above.

For the specific instances in the example, reference may be made to the instances described in the examples described above and the illustrative embodiments, which will not be described in detail herein.

Through the above description of the embodiments, those skilled in the art can clearly understand that the methods of the examples described above can be implemented by means of the software plus necessary general hardware platforms, and certainly can also be implemented through the hardware. The former is a better embodiment in many cases. Based on such understanding, the technical solution in essence of the disclosure or the part that contributes to the prior art can be embodied in the form of software products. The computer software product is stored in one storage medium (such as ROM/RAM, a magnetic disk, or an optical disk), and includes several instructions to make one terminal device (such as a mobile phone, a computer, a server, or a network device) execute the method of each example of the disclosure.

Apparently, those skilled in the art should understand that all the modules or all the steps described above of the disclosure can be implemented through a general computing apparatus, centralized on a single computing apparatus or distributed over a network composed of multiple computing apparatuses, and implemented through program codes executable by the computing apparatus. Therefore, they can be stored in a storage apparatus to be executed by the computing apparatus. In certain cases, the steps shown or described can be executed in a different order from herein. Alternatively, some or all of the modules or the steps are implemented by fabricating same into individual integrated circuit modules separately. In this way, the disclosure is not limited to any specific combination of hardware and software.

What are described are merely the optional examples of the disclosure, but are not intended to limit the disclosure. Those skilled in the art can make various modifications and variations to the disclosure. Any modifications, equivalent replacements, improvements, etc. made within the principles of the disclosure should all fall within the scope of protection of the disclosure.

What is claimed is:

1. A method for random access, applied to a terminal and comprising:
    receiving a broadcast signal sent by a base station on a non-supplementary uplink (non-SUL) carrier, and parsing the broadcast signal to obtain a first reference signal receiving power, RSRP threshold and a second RSRP threshold, wherein the broadcast signal carries the first RSRP threshold and the second RSRP threshold, the second RSRP threshold being greater than the first RSRP threshold, the first RSRP threshold being an RSRP limit value at which a two-step random access message A physical random access channel (MsgA PRACH) signal is received and parsed on the non-SUL carrier to reach a target block error rate, and the second RSRP threshold being an RSRP limit value at which a two-step random access message A physical uplink shared channel (MsgA PUSCH) signal is received and parsed on the non-SUL carrier to reach a target block error rate;
    measuring an RSRP of the broadcast signal on the non-SUL carrier to obtain a measured RSRP; and
    determining carriers for sending the MsgA PUSCH signal and the MsgA PRACH signal separately according to a numerical relation between the measured RSRP and the first RSRP threshold and the second RSRP threshold.

2. The method for random access according to claim 1, wherein the determining carriers for sending the MsgA PUSCH signal and the MsgA PRACH signal separately according to the numerical relation between the measured RSRP and the first RSRP threshold and the second RSRP threshold comprises one of the following:
    sending the MsgA PUSCH signal and the MsgA PRACH signal on an SUL carrier in a condition that the measured RSRP is less than the first RSRP threshold;
    sending the MsgA PUSCH signal on an SUL carrier, and sending the MsgA PRACH signal on the non-SUL carrier in a condition that the measured RSRP is greater than the first RSRP threshold and less than the second RSRP threshold;
    sending the MsgA PUSCH signal and the MsgA PRACH signal on the non-SUL carrier in a condition that the measured RSRP is greater than the second RSRP threshold.

3. The method for random access according to claim 2, wherein access resources of both the SUL carrier and the non-SUL carrier are configured by the base station before the determining carriers for sending the MsgA PUSCH signal and the MsgA PRACH signal separately according to the numerical relation between the measured RSRP and the first RSRP threshold and the second RSRP threshold.

4. The method for random access according to claim 1, wherein access resources of both the SUL carrier and the non-SUL carrier are configured by the base station before the determining carriers for sending the MsgA PUSCH signal and the MsgA PRACH signal separately according to the numerical relation between the measured RSRP and the first RSRP threshold and the second RSRP threshold.

5. A method for random access, applied to a base station and comprising:
    sending a broadcast signal to a terminal on a non-SUL carrier, wherein the broadcast signal is used for instructing the terminal to parse the broadcast signal to obtain a first RSRP threshold and a second RSRP threshold, and the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate; the broadcast signal is further configured for instructing the terminal to measure an RSRP of the broadcast signal on the non-SUL carrier, so as to obtain a measured RSRP; and the broadcast signal is further configured for instructing the terminal to determine carriers for sending the MsgA PUSCH signal and the MsgA PRACH signal separately according to a numerical relation between the measured RSRP and the first RSRP threshold and the second RSRP threshold.

6. The method for random access according to claim 5, wherein the MsgA PUSCH signal and the MsgA PRACH signal are sent on an SUL carrier in a condition that the measured RSRP is less than the first RSRP threshold; or,
    the MsgA PUSCH signal is sent on an SUL carrier, and the MsgA PRACH signal is sent on the non-SUL carrier in a condition that the measured RSRP is greater than the first RSRP threshold and less than the second RSRP threshold; or,
    the MsgA PUSCH signal and the MsgA PRACH signal are sent on the non-SUL carrier in a condition that the measured RSRP is greater than the second RSRP threshold.

7. The method for random access according to claim 6, further comprising:
    configuring access resources of both the SUL carrier and the non-SUL carrier before the determining carriers for sending the MsgA PUSCH signal and the MsgA PRACH signal separately according to the numerical relation between the measured RSRP and the first RSRP threshold and the second RSRP threshold.

8. The method for random access according to claim 5, further comprising:

configuring access resources of both the SUL carrier and the non-SUL carrier before the determining carriers for sending the MsgA PUSCH signal and the MsgA PRACH signal separately according to the numerical relation between the measured RSRP and the first RSRP threshold and the second RSRP threshold.

9. A system for random access, comprising:
a base station and a terminal; wherein
the base station is configured to send a broadcast signal to a terminal on a non-SUL carrier;
the terminal is configured to receive the broadcast signal sent by the base station on the non-SUL carrier, and parse the broadcast signal to obtain a first RSRP threshold and a second RSRP threshold, wherein the broadcast signal carries the first RSRP threshold and the second RSRP threshold, the second RSRP threshold being greater than the first RSRP threshold, the first RSRP threshold being an RSRP limit value at which an MsgA PRACH signal is received and parsed on the non-SUL carrier to reach a target block error rate, and the second RSRP threshold being an RSRP limit value at which an MsgA PUSCH signal is received and parsed on the non-SUL carrier to reach a target block error rate;
the terminal is further configured to measure an RSRP of the broadcast signal on the non-SUL carrier to obtain a measured RSRP; and
the terminal is further configured to determine carriers for sending the MsgA PUSCH signal and the MsgA PRACH signal separately according to a numerical relation between the measured RSRP and the first RSRP threshold and the second RSRP threshold.

10. The system for random access according to claim 9, wherein the terminal is further configured to:
send the MsgA PUSCH signal and the MsgA PRACH signal on an SUL carrier when the measured RSRP is less than the first RSRP threshold; or,
send the MsgA PUSCH signal on an SUL carrier, and sending the MsgA PRACH signal on the non-SUL carrier when the measured RSRP is greater than the first RSRP threshold and less than the second RSRP threshold; or,
send the MsgA PUSCH signal and the MsgA PRACH signal on the non-SUL carrier when the measured RSRP is greater than the second RSRP threshold.

11. The random access system according to claim 9, wherein the base station is further configured for configuring access resources of both the SUL carrier and the non-SUL carrier before the determining carriers for sending the MsgA PUSCH signal and the MsgA PRACH signal separately according to a numerical relation between the measured RSRP and the first RSRP threshold and the second RSRP threshold.

* * * * *